United States Patent
Morita (10) Patent No.: US 10,277,300 B2
(45) Date of Patent: Apr. 30, 2019

(54) COMMUNICATION CONTROL METHOD, GATEWAY APPARATUS, AND USER TERMINAL

(71) Applicant: KYOCERA CORPORATION, Kyoto (JP)

(72) Inventor: Kugo Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 221 days.

(21) Appl. No.: 15/185,893

(22) Filed: Jun. 17, 2016

(65) Prior Publication Data

US 2016/0301461 A1 Oct. 13, 2016

Related U.S. Application Data (63) Continuation of application No. PCT/JP2014/083332, filed on Dec. 17, 2014.

(30) Foreign Application Priority Data

Dec. 20, 2013 (JP) .................................. 2013-264609

(51) Int. Cl.
*H04B 7/14* (2006.01)
*H04W 64/00* (2009.01)
(Continued)

(52) U.S. Cl.
CPC .............. *H04B 7/14* (2013.01); *H04W 8/087* (2013.01); *H04W 64/00* (2013.01); *H04W 8/065* (2013.01);
(Continued)

(58) Field of Classification Search
None
See application file for complete search history.

(56) References Cited

U.S. PATENT DOCUMENTS

2009/0052379 A1* 2/2009 Suh .................... H04L 63/0869
370/328
2011/0222523 A1 9/2011 Fu et al.
(Continued)

FOREIGN PATENT DOCUMENTS

WO 2010/146815 A1 12/2010
WO 2013/180477 A1 12/2013

OTHER PUBLICATIONS

3GPP TS 23.402 V12.3.0 (Dec. 2013); Technical Specification; 3rd Generation Partnership Project; Technical Specification Group Services and System Aspects; Architecture enhancements for non-3GPP accesses (Release 12); pp. 47-59 (Year: 2013).*
(Continued)

*Primary Examiner* — Joseph A Bednash
(74) *Attorney, Agent, or Firm* — Studebaker & Brackett PC (57) ABSTRACT

A communication control method according to the present embodiment comprises the steps of: relaying, by a gateway apparatus in a cellular network, user data from an external network to a user terminal connecting to the cellular network; switching an accommodation target of traffic of the user terminal from the cellular network to another network not managed by an operator managing the cellular network; and relaying, by the gateway apparatus, on a basis of a location of the user terminal in the another network, the user data to the user terminal, via the another network.

3 Claims, 9 Drawing Sheets (51) Int. Cl.
*H04W 8/06* (2009.01)
*H04W 8/08* (2009.01)
*H04W 84/12* (2009.01)
*H04W 36/12* (2009.01)
*H04W 36/14* (2009.01)
*H04W 48/00* (2009.01)
*H04W 60/04* (2009.01)
*H04W 80/04* (2009.01)
*H04W 88/06* (2009.01)
*H04W 88/16* (2009.01)

(52) U.S. Cl.
CPC ............ *H04W 36/12* (2013.01); *H04W 36/14* (2013.01); *H04W 48/17* (2013.01); *H04W 60/04* (2013.01); *H04W 80/04* (2013.01); *H04W 84/12* (2013.01); *H04W 88/06* (2013.01); *H04W 88/16* (2013.01)

(56) References Cited

U.S. PATENT DOCUMENTS

| | | | | |
|---|---|---|---|---|
| 2011/0299463 | A1* | 12/2011 | Bachmann | H04W 8/065 370/328 |
| 2012/0020343 | A1* | 1/2012 | Sugizaki | H04W 48/17 370/338 |
| 2012/0044949 | A1* | 2/2012 | Velev | H04W 8/082 370/401 |
| 2014/0321328 | A1* | 10/2014 | Zuniga | H04W 8/06 370/254 |
| 2015/0139186 | A1 | 5/2015 | Kim et al. | |
| 2015/0163625 | A1* | 6/2015 | Saida | H04W 48/16 455/456.1 |

OTHER PUBLICATIONS

3GPP TS 24.303 V11.3.0 (Jun. 2013); Technical Specification; 3rd Generation Partnership Project; Technical Specification Group Core Network and Terminals; Mobility management based on Dual-Stack Mobile IPv6; Stage 3 (Release 11) (Year: 2013).*

The extended European search report issued by the European Patent Office dated May 9, 2017, which corresponds to European Patent Application No. 14872441.2-1854 and is related to U.S. Appl. No. 15/185,893; 14pp.

3rd Generation Partnership Project; Technical Specification Group Services and System Aspects; IP flow mobility and seamless Wireless Local Area Network (WLAN) offload; Stage 2 (release 11); 3GPP TS23.261 V11.00.0; Sep. 2012; 22pp.

ZTE; "Discussion of the LOBSTER solutions"; SA WG2 Meeting #85; S2-112314; May 16-20, 2011; Xi'An, P.R. China;6pp.

Samsung; "CN impacts of RAN2 solutions for WLAN/3GPP interworking"; 3GPP TSG-RAN Meeting #83bis; R2-133233; Ljubljana, Slovenia; Oct. 7-11, 2013; 8pp.

3rd Generation Partnership Project; 3GPP TS 2.402 V12.3.0; (Dec. 2013); Release 12; pp. 85-288.

International Search Report issued in PCT/JP2014/083332; dated Mar. 24, 2015.

Written Opinion issued in PCT/JP2014/083332; dated Mar. 24, 2015.

3rd Generation Partnership Project; Technical Specification Group Radio Access Network; Study on WLAN/3GPP Radio Interworking; 3GPP; TR 37.834; V1.0.0; Aug. 2013; pp. 1-14; Release 12; 3GPP Organizational Partners.

* cited by examiner

FIG. 10

COMMUNICATION CONTROL METHOD, GATEWAY APPARATUS, AND USER TERMINAL

TECHNICAL FIELD

The present disclosure relates to a communication control method, a gateway apparatus, and a user terminal used in a communication system capable of switching an accommodation target of traffic of a user terminal from a cellular network to another network.

BACKGROUND ART

In recent years, the use of a user terminal capable of connecting not only to a cellular network but also to another network expands. For example, the use of a user terminal (so-called dual terminal) capable of connecting to a cellular network and a wireless LAN (Local Area Network) expands, and therefore, in 3GPP (3rd Generation Partnership Project) which is a project aiming to standardize a cellular communication system, a technology is being considered which is capable of strengthening cooperation between a cellular RAN (Radio Access Network) and a wireless LAN (see Non Patent Document 1).

In such a user terminal, it is possible to switch an accommodation target of traffic of a user terminal from a cellular network to another network. As a result, it is possible to reduce traffic load of a cellular network (offload).

PRIOR ART DOCUMENT

Non-Patent Document

Non Patent Document 1: 3GPP technical report "TR 37.834 V1.0.0" August, 2013

SUMMARY

An object of the present disclosure is to provide a communication control method, a gateway apparatus, and a user terminal capable of realizing a seamless offload when an accommodation target of traffic of a user terminal is switched from a cellular network to another network (network not managed by an operator managing the cellular network, for example).

A communication control method according to an embodiment comprises the steps of: relaying, by a gateway apparatus in a cellular network, user data from an external network to a user terminal connecting to the cellular network; switching an accommodation target of traffic of the user terminal from the cellular network to another network not managed by an operator managing the cellular network; and relaying, by the gateway apparatus, on a basis of a location of the user terminal in the another network, the user data to the user terminal, via the another network.

DESCRIPTION OF THE EMBODIMENT

Overview of Embodiment

A communication control method according to an embodiment comprises the steps of: relaying, by a gateway apparatus in a cellular network, user data from an external network to a user terminal connecting to the cellular network; switching an accommodation target of traffic of the user terminal from the cellular network to another network not managed by an operator managing the cellular network; and relaying, by the gateway apparatus, on a basis of a location of the user terminal in the another network, the user data to the user terminal, via the another network.

The communication control method according to an embodiment further comprises: registering, by the gateway apparatus, the location of the user terminal in the another network, when being requested from the user terminal to register the location of the user terminal.

The communication control method according to an embodiment further comprises: requesting, by the user terminal, on a basis of a global address of the gateway apparatus, the gateway apparatus to register the location of the user terminal.

The communication control method according to an embodiment further comprises: registering, by the gateway apparatus, when receiving information on the location of the user terminal in the another network from the user terminal, the location of the user terminal in the another network, on a basis of information.

In the embodiment, it comprises the steps of: acquiring, by the user terminal, an address of a home agent managing the location of the user terminal; and inquiring, by the user terminal, the cellular network of whether or not the address of the home agent is the global address of the gateway apparatus in the cellular network. In the requesting, when the address of the home agent is the global address of the gateway apparatus, the user terminal requests registration of the location of the user terminal.

The communication control method according to an embodiment further comprises the steps of: notifying, by the user terminal, the cellular network of identification information of a communication node of a connection target in the another network; and receiving, by the user terminal, the global address of the gateway apparatus from the cellular network when the communication node is not a communication node managed by the operator.

The communication control method according to an embodiment further comprises the steps of: receiving, by the user terminal, first information including identification information of a wireless LAN access point from a server managing ANDSF information on a wireless LAN; determining, by the user terminal, whether or not identification information of a wireless LAN access point of a connection target in the another network is included in the first information; and requesting, by the user terminal, to the cellular network, the global address of the gateway apparatus when determining that the identification information of the wireless LAN access point of the connection target is not included in the first information.

The communication control method according to an embodiment further comprises the steps of: acquiring, by the user terminal, an address of a home agent managing the location of the user terminal, and transmitting the address of the home agent to the cellular network; determining, by the cellular network, whether or not the address of the home agent is the global address of the gateway apparatus; determining, by the cellular network, whether or not the user data is relayed via the home agent before the accommodation target of the traffic is switched; maintaining, by the user terminal, connection with the cellular network even after the switching, when it is determined that the acquired address of the home agent is not the global address of the gateway apparatus and the user data is not relayed via the home agent; receiving, by the user terminal, even after the switching, via the cellular network from the gateway apparatus, user data on communication started by the user terminal before the switching; and receiving, by the user terminal, via the another network from a network apparatus different from the gateway apparatus, user data on communication newly started by the user terminal after the switching.

The communication control method according to an embodiment further comprises the steps of: maintaining, by the user terminal, connection with the cellular network even after the switching, when it is not possible for the user terminal to acquire the global address of the gateway apparatus; receiving, by the user terminal, even after the switching, via the cellular network from the gateway apparatus, user data on communication started by the user terminal before the switching; and receiving, by the user terminal, via the another network from a network apparatus different from the gateway apparatus, user data on communication newly started by the user terminal after the switching.

A gateway apparatus according to an embodiment is a gateway apparatus in a cellular network, and is used in a communication system capable of switching an accommodation target of traffic of a user terminal from the cellular network to another network. The gateway apparatus comprises: a controller configured to relay user data from an external network to the user terminal connecting to the cellular network. After the accommodation target of the traffic of the user terminal is switched from the cellular network to the another network not managed by an operator managing the cellular network, the controller relays, on a basis of a location of the user terminal in the another network, via the another network, the user data to the user terminal.

A user terminal according to an embodiment is a user terminal used in a communication system capable of switching an accommodation target of traffic of a user terminal from a cellular network to another network. The user terminal comprises: a receiver configured to receive, while being connected to the cellular network, user data that is relayed from a gateway apparatus in the cellular network and that is from an external network; and a controller configured to request, after the accommodation target of the traffic of the user terminal is switched from the cellular network to the another network not managed by an operator managing the cellular network, the gateway apparatus to register a location of the user terminal in the another network. The receiver receives the user data via the another network from the gateway apparatus.

In the embodiment, the controller transmits, when requesting the gateway apparatus to register the location of the user terminal in the another network, information on the location of the user terminal in the another network, to the gateway apparatus.

Embodiment

Hereinafter, with reference to the drawings, embodiments will be described in which a cellular communication system (LTE system) configured to comply with the 3GPP standards is cooperated with a wireless LAN (WLAN) system.

(System Configuration)

Figure 1:
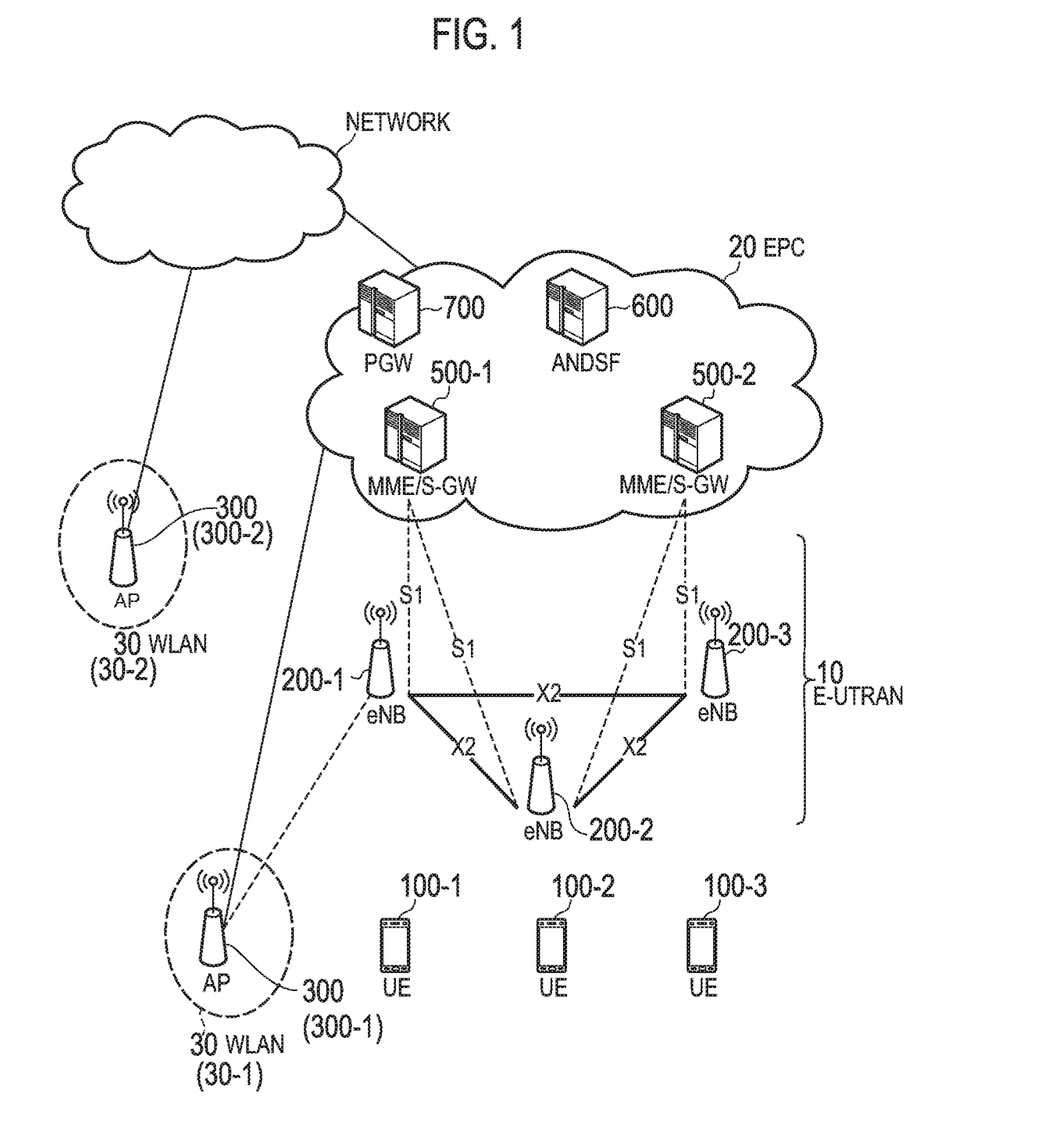
FIG. 1 is a system configuration diagram according to an embodiment.

FIG. 1 is a system configuration diagram according to the embodiment. As shown in FIG. 1, a cellular communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a cellular RAN. The EPC 20 corresponds to a core network. The E-UTRAN 10 and the EPC 20 configure a network (cellular network) of the cellular communication system.

The UE 100 is a mobile-type radio communication apparatus and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 corresponds to a cellular base station. The eNB 200 manages one cell or a plurality of cells, and performs radio communication with the UE 100 with which a connection is established with a cell of the eNB 200. It is noted that the "cell" is used as a term indicating a minimum unit of a radio communication area, and is also used as a term indicating a function of performing radio communication with the UE 100. Furthermore, the eNB 200 has a radio resource management (RRM) function, a routing function of user data, and a measurement control function for mobility control and scheduling, for example.

The eNB 200 is connected mutually via an X2 interface. Furthermore, the eNB 200 is connected, via an S1 interface, to an MME (Mobility Management Entity)/S-GW (Serving-Gateway) 500 included in the EPC 20.

The EPC 20 includes a plurality of MME/S-GWs 500 and PGWs (Packet Data Network Gateways) 700. The MME is a network node that performs various mobility controls, for example, for the UE 100 and corresponds to a controller. The S-GW is a network node that performs control to transfer user data and corresponds to a mobile switching center. The PGW 700 is a network node that controls to relay user data from an external network (and to an external network) not managed by an operator of the cellular network. In the present embodiment, the PGW 700 has a function, as an HA (Home Agent), of managing the location of the UE 100. Furthermore, the PGW 700 functions as an LMA (Local Mobility Anchor) that switches a communication route to map an existing area of the UE 100 and relays the user data of the UE 100 to the existing area. Specifically, the PGW 700 transfers the user data to an MAG (Mobility Access Gateway) in a network to which the UE 100 is connected.

A WLAN 30 includes a WLAN access point (hereinafter, briefly referred to as "AP") 300. Specifically, a WLAN 30-1 includes an AP managed by an operator of a cellular network (Operator controlled AP), and is supported by the operator of the cellular network. On the other hand, a WLAN 30-2 includes an AP 300-2 not managed by the operator of the cellular network, and is not supported by the operator of the cellular network.

The WLAN 30 is configured to comply with standards of IEEE 802.11, for example. The AP 300 performs communication with the UE 100 in a frequency band (WLAN frequency band) different from a cellular frequency band. The AP 300 is connected, via a router or the like, to the EPC 20.

Furthermore, in addition to a case where the eNB 200 and the AP 300 are individually located, the eNB 200 and the AP 300 may also be "Collocated". As one mode of the "Collocated", the eNB 200 and the AP 300 may be directly connected to each other through any interface of an operator.

The EPC 20 further includes an ANDSF (Access Network Discovery and Selection Function) server 600. The ANDSF server 600 manages ANDSF information on the WLAN 30. The ANDSF server 600 provides the UE 100 with the ANDSF information on the WLAN 30, by an NAS (Non Access Stratum) message.

It is noted that the ANDSF server 600 utilized by the UE 100 in an H-PLMN (Home Public Land Mobile Network) is called an H-ANDSF server. The ANDSF server 600 utilized, during roaming, by the UE 100 in a V-PLMN (Visited Public Land Mobile Network) is called a V-ANDSF server.

Next, configurations of the UE 100, the eNB 200, and the AP 300 will be described.

Figure 2:
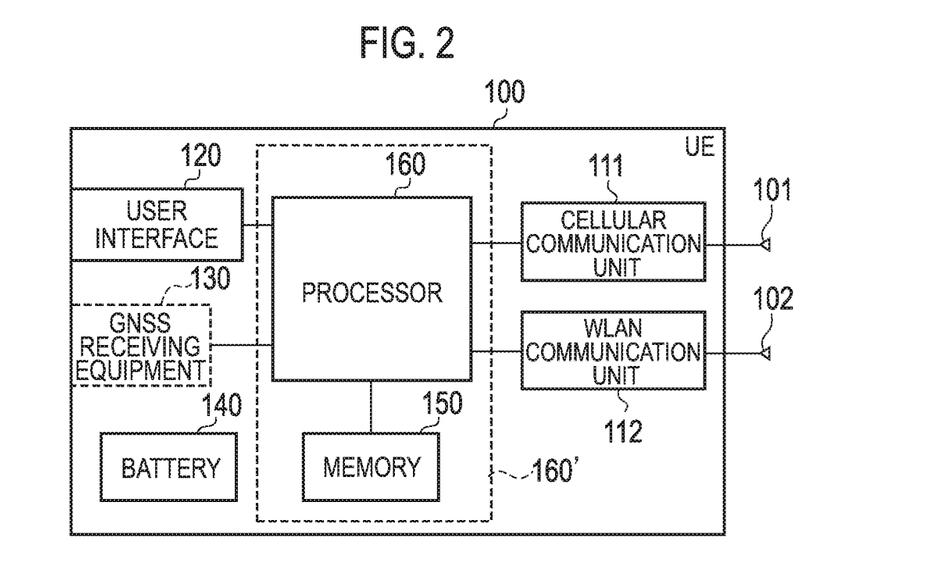
FIG. 2 is a block diagram of a UE according to the embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiving equipment 130; a battery 140; a memory 150; and a processor 160. The memory 150 and the processor 160 configure a controller. The UE 100 may not include the GNSS receiving equipment 130. Furthermore, the memory 150 may be integrally formed with the processor 160, and this set (that is, a chip set) may be called a processor 160'.

The antenna 101 and the cellular communication unit 111 are used for transmitting and receiving a cellular radio signal. The cellular communication unit 111 converts a baseband signal output from the processor 160 into a cellular radio signal, and transmits the same from the antenna 101. Furthermore, the cellular communication unit 111 converts a cellular radio signal received by the antenna 101 into a baseband signal, and outputs the same to the processor 160.

The antenna 102 and the WLAN communication unit 112 are used for transmitting and receiving a WLAN radio signal. The WLAN communication unit 112 converts a baseband signal output from the processor 160 into a WLAN radio signal, and transmits the same from the antenna 102. Furthermore, the WLAN communication unit 112 converts the WLAN radio signal received by the antenna 102 into the baseband signal, and outputs the same to the processor 160.

The user interface 120 is an interface with a user carrying the UE 100, and includes a display, a microphone, a speaker, and various buttons, for example. Upon receipt of the input from a user, the user interface 120 outputs a signal indicating a content of the input to the processor 160. The GNSS receiving equipment 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding, and the like on the baseband signal and a CPU that performs various types of processes by executing the program stored in the memory 150. The processor 160 may further include a codec that performs encoding and decoding on sound and video signals. The processor 160 executes various types of processes and various types of communication protocols described later.

Figure 3:
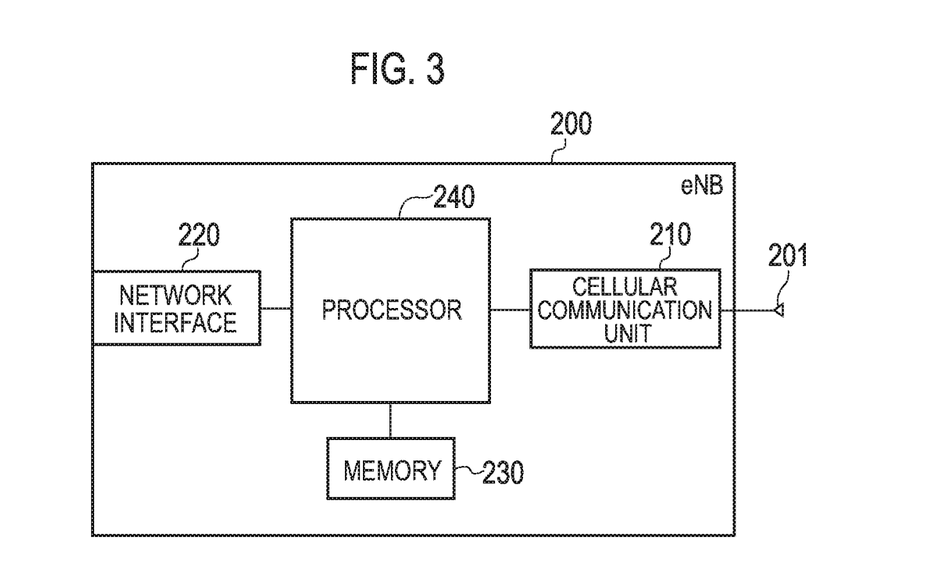
FIG. 3 is a block diagram of an eNB according to the embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a controller. It is noted that the memory 230 may be integrally formed with the processor 240, and this set (that is, a chipset) may be called a processor.

The antenna 201 and the cellular communication unit 210 are used for transmitting and receiving a cellular radio signal. The cellular communication unit 210 converts a baseband signal output from the processor 240 into a cellular radio signal, and transmits the same from the antenna 201. Furthermore, the cellular communication unit 210 converts a cellular radio signal received by the antenna 201 into a baseband signal, and outputs the same to the processor 240.

The network interface 220 is connected to a neighboring eNB 200 via the X2 interface and is connected to the MME/S-GW 500 via the S1 interface. Furthermore, the network interface 220 is used for communication with the AP 300 via the EPC 20.

The memory 230 stores a program to be executed by the processor 240 and information to be used for a process by the processor 240. The processor 240 includes a baseband processor that performs modulation and demodulation, encoding and decoding, and the like on the baseband signal and a CPU that performs various types of processes by executing the program stored in the memory 230. The processor 240 executes various types of processes and various types of communication protocols described later.

Figure 4:
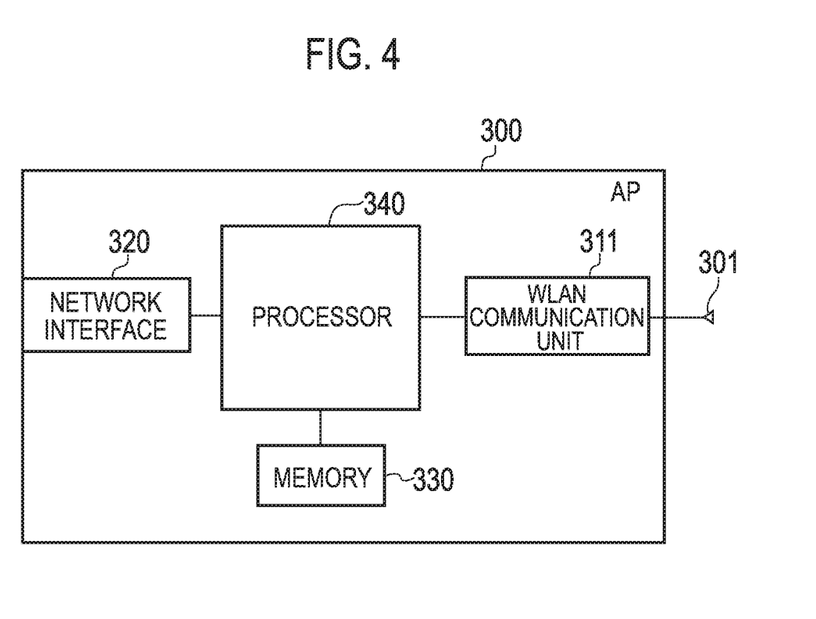
FIG. 4 is a block diagram of an AP according to the embodiment.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving a WLAN radio signal. The WLAN communication unit 311 converts a baseband signal output from the processor 340 into a WLAN radio signal, and transmits the same from the antenna 301. Furthermore, the WLAN communication unit 311 converts a WLAN radio signal received by the antenna 301 into a baseband signal, and outputs the same to the processor 340.

The network interface 320 is connected to the EPC 20 via a router, and the like. Furthermore, the network interface 320 is used for communication with the eNB 200 via the EPC 20.

The memory 330 stores a program to be executed by the processor 340 and information to be used for a process by the processor 340. The processor 340 includes a baseband processor that performs modulation and demodulation, encoding and decoding, and the like on the baseband signal and a CPU that performs various types of processes by executing the program stored in the memory 330.

Figure 5:
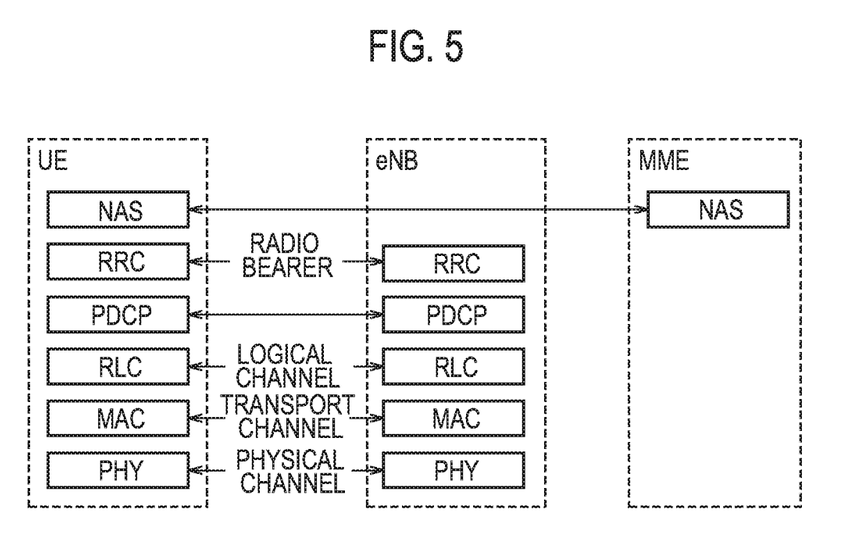
FIG. 5 is a protocol stack diagram of a radio interface in a cellular communication system.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a scheduler that selects an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a connection state (an RRC connection state) of cellular communication, and when the RRC connection is not established, the UE 100 is in an idle state (an RRC idle state) of the cellular communication.

A NAS (Non-Access Stratum) layer positioned above the RRC layer performs session management or mobility management, for example. The MME 300 and the ANDSF server 600 transmit and receive a NAS message from and to the UE 100.

(Operation According to Embodiment)

An operation according to the embodiment will be described, below.

(1) Operation Overview

Figure 6A:
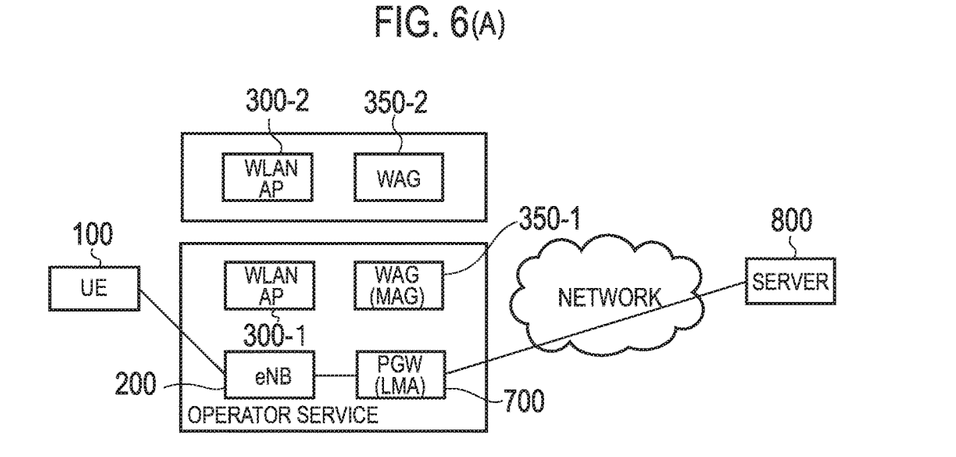
FIGS. 6(A) to 6(C) are diagrams for describing an operation overview according to the embodiment.
Figure 6B:
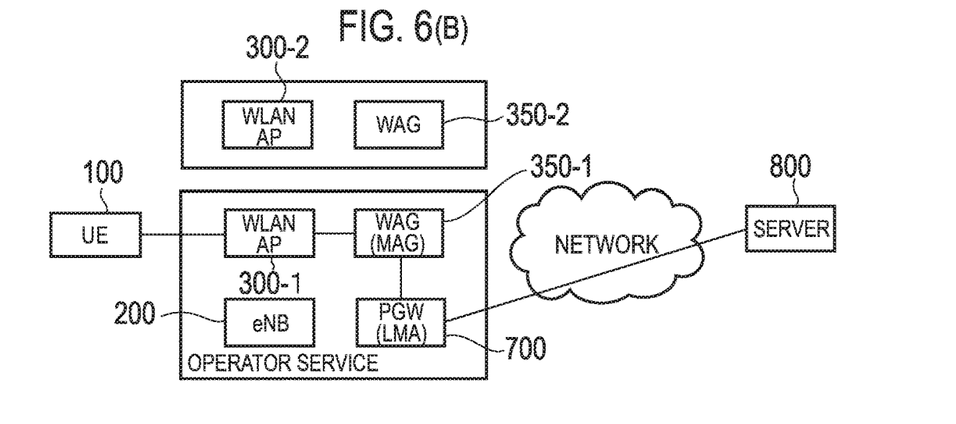
Figure 6C:
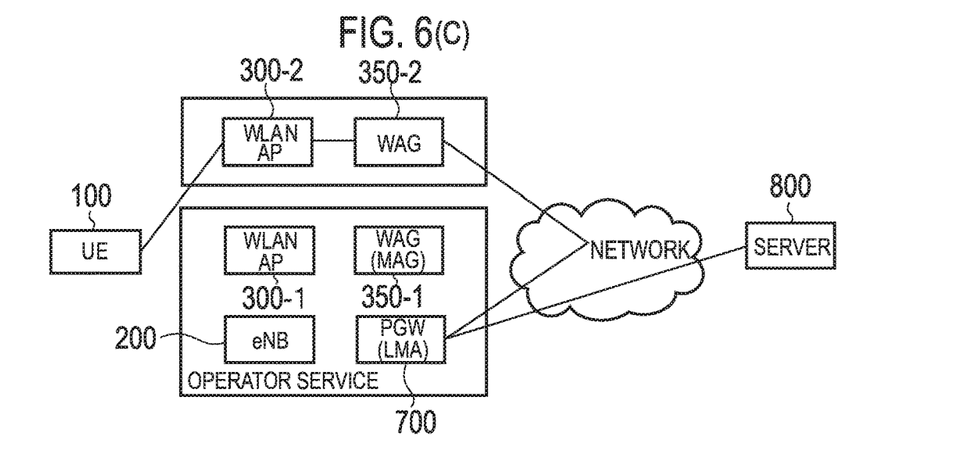

FIGS. 6(A) to 6(C) are diagrams for describing an operation overview according to the embodiment. FIG. 6(A) is a diagram for describing a user data relay before the accommodation target of the traffic is switched. FIG. 6(B) is a diagram for describing a user data relay after the accommodation target of the traffic is switched to a wireless LAN network managed by a common operator. FIG. 6(C) is a diagram (part 1) for describing a user data relay after the accommodation target of the traffic is switched to a wireless LAN network managed by a different operator.

In FIGS. 6(A) to 6(C), there are two types of wireless LAN networks configured by a WAG 350 (WAG 350-1/WAG 350-2) and a WLAN AP (AP 300-1/AP 300-2). One wireless LAN network (hereinafter, referred to as first wireless LAN network, where appropriate) is a network managed by an operator that manages the cellular network. Therefore, the first wireless LAN network and the cellular network are common in operator service. The other wireless LAN network (hereinafter, referred to as second wireless LAN network, where appropriate) is a network not managed by the operator that manages the cellular network.

Here, the WAG 350 is a gateway apparatus (WAG: WLAN Access Gateway) in the wireless LAN network, and relays the user data from the external network. Furthermore, the WAG 350-1 included in the wireless LAN network common in operator service corresponds to an MAG, and receives the user data from a PGW 700 corresponding to an LMA.

Firstly, as shown in FIG. 6(A), before switching the accommodation target of the traffic of the UE 100, the UE 100 performs communication with a server 800 connected via the external network, and transmits and receives the user data with the server 800. The UE 100 is connected to the eNB 200. The UE 100 transmits and receives the user data through a data path via the PGW 700 and the eNB 200.

Next, when the accommodation target of the traffic of the UE 100 is switched from the cellular network to the first wireless LAN network, as shown in FIG. 6(B), the UE 100 is connected to the AP 300-1. In this case, the UE 100 transmits and receives the user data through a data path via the PGW 700, the WAG 350-1, and the AP 300-1.

The cellular network and the first wireless LAN network are common in operator, and thus, it is possible to previously set the WAG 350-1 that functions as the MAG, to the PGW 700, for example. As a result, the PGW 700 is capable of relaying the user data to the WAG 350-1.

Next, when the accommodation target of the traffic of the UE 100 is switched from the cellular network to the second wireless LAN network, as shown in FIG. 6(C), the UE 100 is connected to the AP 300-2. In this case, the UE 100 transmits and receives the user data through a data path via the PGW 700, the WAG 350-2, and the AP 300-2. That is, the user data received by the PGW 700 is not discarded, but is relayed via the WAG 350-2 to the UE 100, and thus, the UE 100 is capable of receiving, without discontinuation, the user data. As a result, even when the accommodation target of the traffic of the UE 100 is switched from the cellular network to the second wireless LAN network, it is possible to realize a seamless offload.

An operation by the PGW 700 to relay the user data to the WAG 350-2 will be described later.

(2) Operation Sequence

Figure 7:
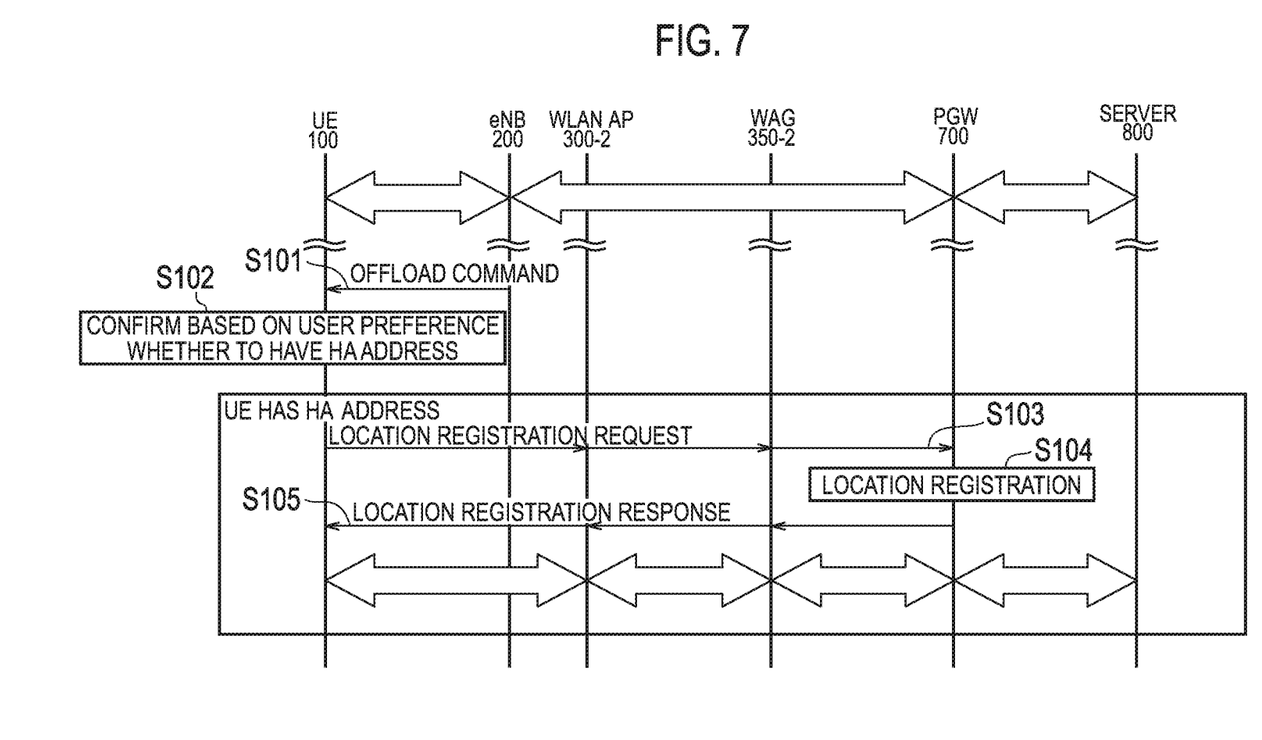
FIG. 7 is a sequence diagram for describing an operation sequence 1 according to the embodiment.
Figure 8:
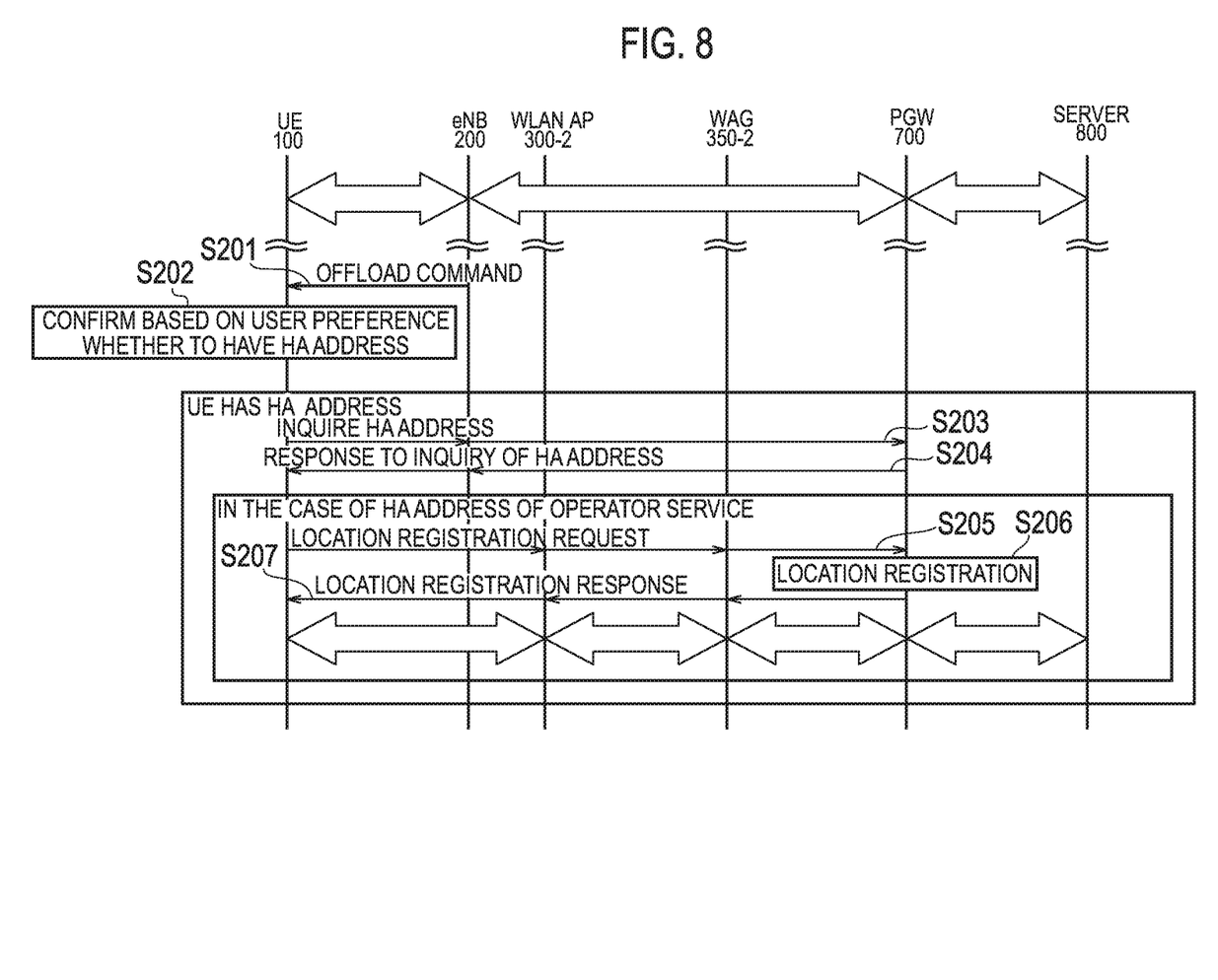
FIG. 8 is a sequence diagram for describing an operation sequence 2 according to the embodiment.
Figure 9:
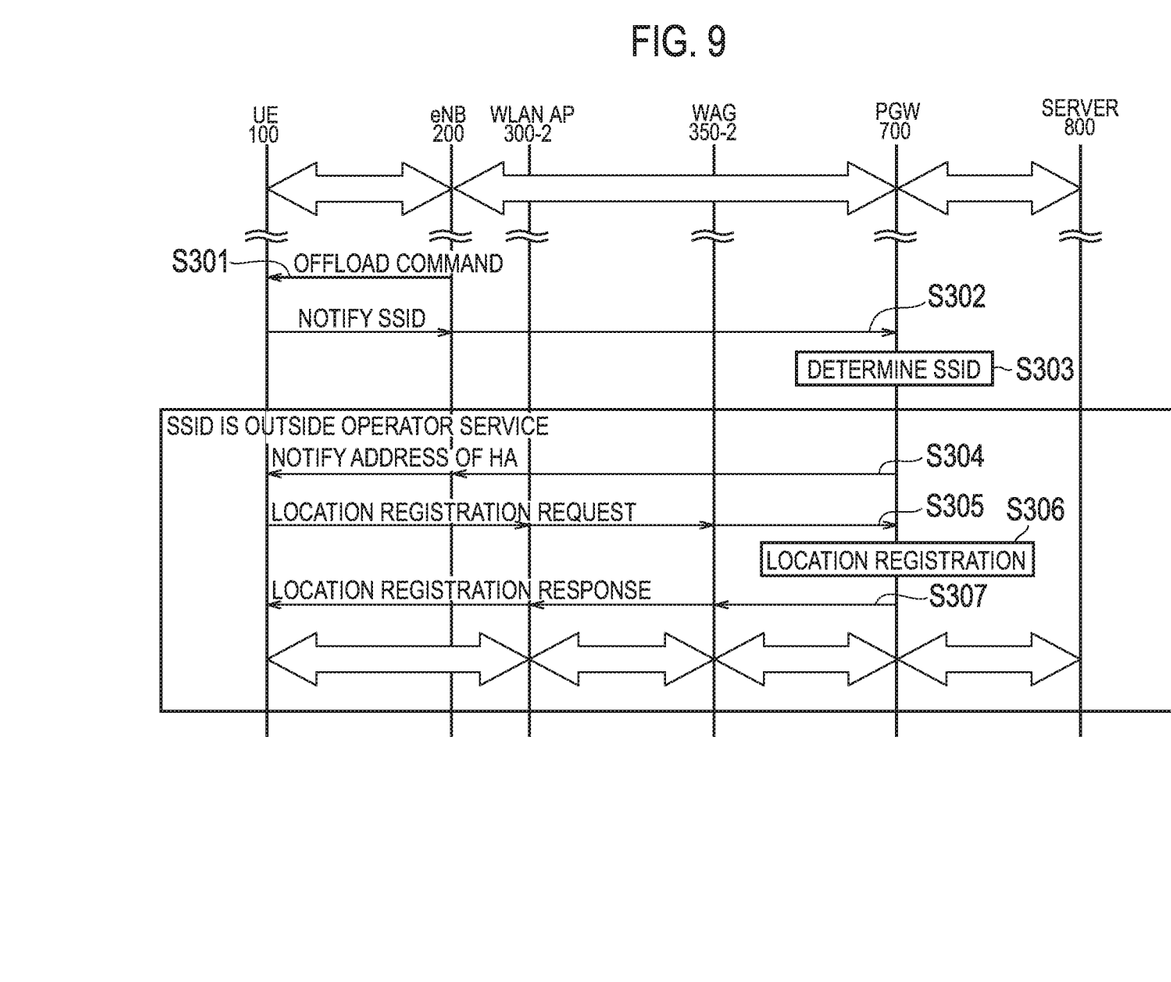
FIG. 9 is a sequence diagram for describing an operation sequence 3 according to the embodiment.
Figure 10:
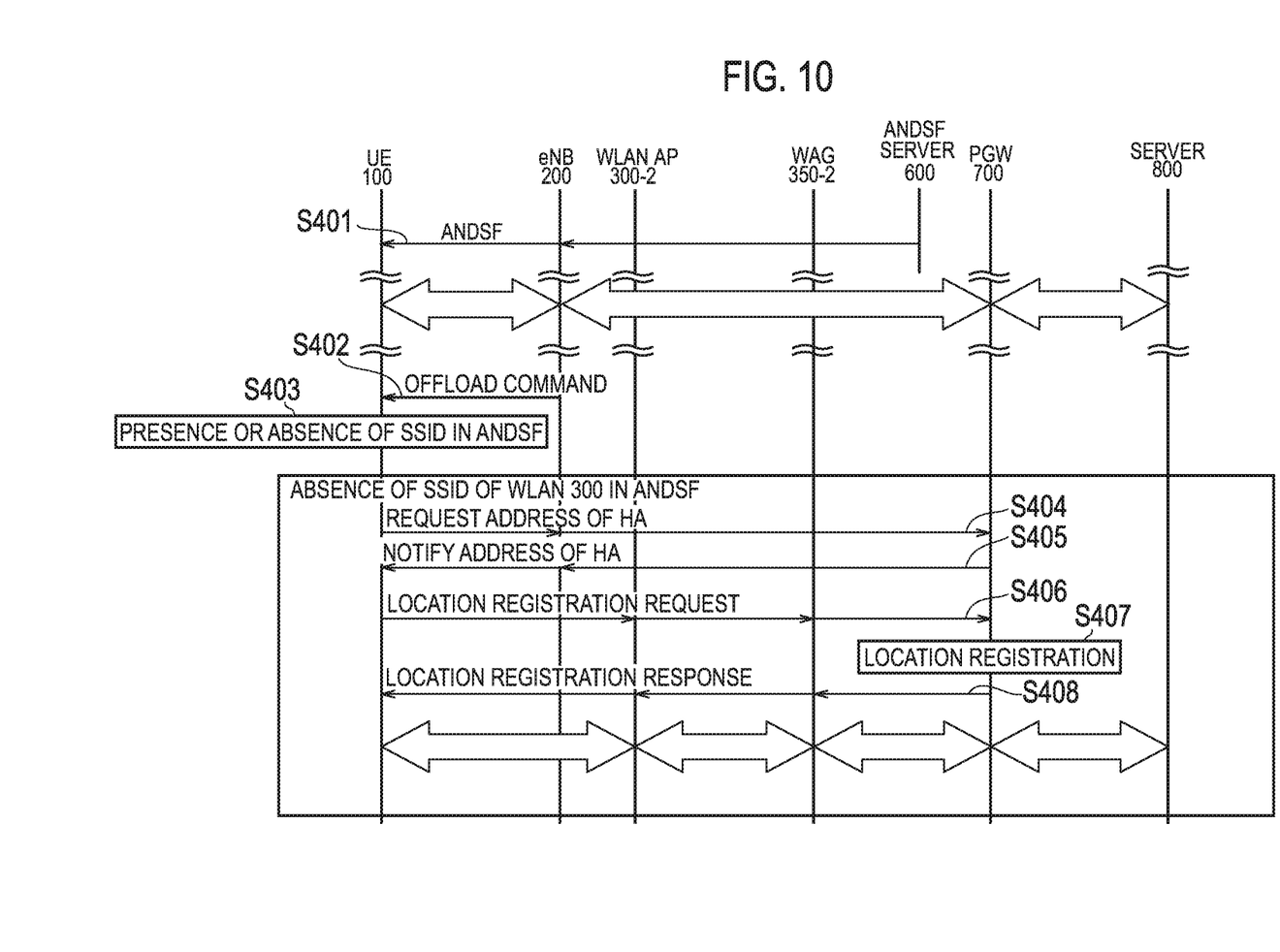
FIG. 10 is a sequence diagram for describing an operation sequence 4 according to the embodiment.

Next, operation sequences 1 to 4 that are operation sequences according to the embodiment will be described by using FIGS. 7 to 10. FIG. 7 is a sequence diagram for describing the operation sequence 1 according to the embodiment. FIG. 8 is a sequence diagram for describing the operation sequence 2 according to the embodiment. FIG. 9 is a sequence diagram for describing the operation sequence 3 according to the embodiment. FIG. 10 is a sequence diagram for describing the operation sequence 4 according to the embodiment.

(2-1) Operation Sequence 1

The UE 100 is connected to the eNB 200 included in the cellular network and performs communication with the server 800.

In step S101, the eNB 200 transmits, to the UE 100, an offload command to transit the traffic of the UE 100. The UE 100 receives the offload command.

The UE 100-1 that receives the offload command compares information (received signal intensity and load information, for example) measured from the AP 300 with a threshold value, and decides the AP 300 of an offload target. At this time, the UE 100-1 may refer to user preference information on a user preference recorded in the memory 150, and use a threshold value in which the user preference is reflected in a numerical value so that the AP of user preference is preferentially selected (and decided) as the AP of the offload target.

Here, examples of the AP of user preference include AP not managed by the operator (AP of a home managed by the user of the UE 100, etc.). The user preference information includes an identifier of the AP (SSID, etc.), an address of an HA (Home Agent) corresponding to the (identifier of) the AP, and the like. The address of the HA may be a global address of the PGW 700. When the UE 100 is connected to the AP, the HA corresponding to the AP manages the location of the UE 100 and relays the user data.

The UE 100 may acquire the user preference information as a result of direct input by the user operation, and may acquire the user preference from a predetermined server as a result of a user inputting an address of the predetermined server.

Description proceeds on the assumption that the UE 100 decides, as the AP of the offload target, the AP 300-2 of user preference based on the user preference information, below.

In step S102, the UE 100-1 confirms on the basis of the user preference information whether or not to have an address of the HA corresponding to the AP 300-2 of the offload target.

When having the address of the HA corresponding to the AP 300-2, the UE 100-1 executes a process of step S103. Description proceeds on the assumption that the address of the HA is a global address of the PGW 700, below. It is noted that when not having the address of the HA corresponding to the AP 300-2 of the offload target, the UE 100-1 transmits and receives the user data through a data path not passing through the PGW 700 (not shown).

Next, the UE 100 ends the connection with the eNB 200, and performs connection with the AP 300-2 of the offload target. The UE 100 establishes a new data path with the server 800. Furthermore, the UE 100 acquires an address of the UE 100 in the wireless LAN network.

In step S103, the UE 100 requests the PGW 700 to register the location of the UE 100, on the basis of the global address of the PGW 700. Specifically, the UE 100 requests the location registration to the PGW 700, via the wireless LAN network (that is, the AP 300-2 and the WAG 350-2). The request for the location registration includes an identifier of the UE 100 and the address of the UE 100 in the wireless LAN network.

Here, the global address is an address unique not only to the cellular network but also to another network, and thus, the UE 100 is capable of accessing the PGW 700 from the wireless LAN network.

In step S104, the PGW 700 registers the location of the UE 100 in the wireless LAN network, on the basis of the request for the location registration from the UE 100. Specifically, the PGW 700 registers, in a location management list, the identifier of the UE 100 and the address of the UE 100 in the wireless LAN network in an associated manner.

In step S105, the PGW 700 transmits a response to the request for the location registration (location registration response), to the UE 100. The PGW 700 transmits the location registration response to the UE 100 via the wireless LAN network, on the basis of the address of the UE 100 in the wireless LAN network. The UE 100 knows that the location of the UE 100 is registered in the PGW 700 as a result of receiving the location registration response.

Thereafter, the PGW 700 relays, on the basis of the address of the UE 100 in the wireless LAN network, the user data of the UE 100 received from the server 800, to the UE 100 via the WAG 350-2. The UE 100 is capable of receiving the user data transmitted to the PGW 700, and thus, it is possible to realize a seamless offload without a temporary communication breakdown.

(2-2) Operation Sequence 2

Next, the operation sequence 2 will be described by using FIG. 8. It is noted that a description will be provided while focusing on a portion different from the above-described operation sequence 1, and a description of a similar portion will be omitted, where necessary.

In the operation sequence 2, the UE 100 performs an operation for confirming whether or not the address of the HA is the global address of the PGW 700.

In FIG. 8, steps S201 and S202 correspond to steps S101 and S102.

It is noted that when it is already known that the address of the HA is the global address of the PGW 700 on the basis of past history information, for example, the UE 100 is capable of omitting the processes of steps S203 and S204. In this case, the UE 100 executes the same process as that in the operation sequence 1.

In step S203, when having the address of the HA corresponding to the AP 300-2 of the offload target, the UE 100 inquires the cellular network (specifically, the PGW 700) of whether or not the address of the HA is the global address of the PGW 700 to which the connection is currently established. The information indicating this inquiry includes the address of the HA provided in the UE 100.

The PGW 700 determines whether the address of the HA included in the information indicating the inquiry matches an address of the PGW 700.

In step S204, the PGW 700 transmits a response to the inquiry, to the UE 100. The response includes information indicating whether or not the HA address matches the address of the PGW 700.

Steps S205 to S207 correspond to steps S103 to S105.

In the operation sequence 2, the UE 100 performs the inquiry of the HA address, and thus, the UE 100 does not send the location registration request to an HA different from the connected PGW 700 after the accommodation target of the traffic of the UE 100 is switched to the wireless LAN network. Thus, it is possible to suppress the generation of unnecessary traffic.

(2-3) Operation Sequence 3

Next, the operation sequence 3 will be described by using FIG. 9. It is noted that a description will be provided while focusing on a portion different from the above-described operation sequence 1, and a description of a similar portion will be omitted, where necessary.

In the operation sequences 1 and 2, the UE 100 acquires the global address of the PGW 700, on the basis of the user operation. On the other hand, in the operation sequence 3, the UE 100 acquires the global address of the PGW 700 from the cellular network (specifically, the PGW 700).

In FIG. 9, step S301 corresponds to step S101.

In step S302, the UE 100 notifies the PGW 700 of information (for example, SSID) indicating an identifier of the AP 300-2 to be connected in the offload target. The UE 100 may decide the identifier of the AP 300-2 of the offload target with reference to the user preference information, and the UE 100 may decide the identifier of the AP 300-2 of the offload target, on the basis of the identifier of the AP 300-2 included in the offload command.

In step S303, the PGW 700 determines whether or not the AP 300-2 indicated by the notified SSID is an AP managed by the operator. That is, the PGW 700 determines whether or not the operator managing the PGW 700 and the operator managing the AP 300-2 are in common. For example, the PGW 700 holds list information of the identifier (SSID) of the AP managed by the operator managing the PGW 700, and compares the list information with the notified SSID to make the determination.

When determining that the AP 300-2 is not the AP managed by the operator, the PGW 700 executes a process of step S304. It is noted that when it is assumed that the AP of the offload target of the UE 100 is the AP 300-1, the PGW 700 determines that the AP 300-1 is the AP managed by the operator. In this case, the PGW 700 relays the user data of the UE 100 received after the accommodation target of the traffic is switched, via the WAG 350-1 and the AP 300-1.

In step S304, the PGW 700 notifies the UE 100 of the global address of the PGW 700 that functions as the HA. The UE 100 receives the global address of the PGW 700.

Steps S305 to S307 correspond to steps S103 to S105.

In the operation sequence 3, when connecting to the wireless LAN network not managed by the operator managing the cellular network, the UE 100 is capable of receiving the global address of the PGW 700. That is, only when the location registration to the PGW 700 is needed, the UE 100 is capable of receiving the global address of the PGW 700. Thus, it is possible to suppress the generation of unnecessary traffic.

(2-4) Operation Sequence 4

Next, the operation sequence 4 will be described by using FIG. 10. It is noted that a description will be provided while focusing on a portion different from the above-described operation sequence 1, and a description of a similar portion will be omitted, where necessary.

In the above-described operation sequence 3, when the AP 300-2 that is the connection target after the accommodation target of the traffic is switched is not the AP managed by the operator, the UE 100 receives the global address of the PGW 700. On the other hand, in the operation sequence 4, the UE 100 requests, on the basis of a predetermined condition, the global address of the PGW 700 to the cellular network (specifically, the PGW 700).

As shown in FIG. 10, in step S401, the ANDSF server 600 transmits ANDSF information on the WLAN 30, to the UE 100. The UE 100 receives the ANDSF information while being connected to the cellular network. Description proceeds on the assumption that the ANDSF information includes the identifier of the AP. The AP indicated by the identifier of the AP included in the ANDSF information is an AP managed by the operator managing the cellular network.

Step S402 corresponds to step S101.

In step S403, the UE 100 determines whether or not the AP 300-2 that is the connection target after the accommodation target of the traffic is switched is the AP included in the ANDSF information. Specifically, the UE 100 determines whether or not the identifier of the AP 300-2 matches the identifier of the AP included in the ANDSF information.

When the identifier of the AP 300-2 is not included in the ANDSF information, the UE 100 executes a process of step S404.

In step S404, the UE 100 requests, as the address of the HA, the global address of the PGW 700 to the PGW 700. The PGW 700 receives the request.

In step S405, the PGW 700 notifies, on the basis of the request from the UE 100, the UE 100 of the global address of the PGW 700. The UE 100 receives the notification of the global address of the PGW 700.

Steps S406 to S408 correspond to steps S103 to S105.

In the operation sequence 4, when the identifier of the AP 300-2 is not included in the ANDSF information, the AP 300-2 is not managed by the operator managing the cellular network. Therefore, only when the location registration to the PGW 700 is needed, the UE 100 is capable of acquiring the global address of the PGW 700. Thus, it is possible to suppress the generation of unnecessary traffic.

Other Embodiments

As described above, the present disclosure has been described with the embodiments. However, it should not be understood that those descriptions and drawings constituting a part of the present disclosure limit the present disclosure. From this disclosure, a variety of alternate embodiments, examples, and applicable techniques will become apparent to one skilled in the art.

In the above-described operation sequence 2, when the address of the HA received from the UE 100 does not match the address of the PGW 700, the PGW 700 only notifies the UE 100 of this unmatch; however, this is not limiting.

For example, when the address of the HA received from the UE 100 does not match the address of the PGW 700, the PGW 700 may determine, before switching the accommodation target of the traffic, whether or not the user data of the UE 100 is relayed via the HA indicated by the address of the HA. Specifically, the PGW 700 determines whether or not the address of the HA received from the UE 100 matches an address of an apparatus that is a relay source relaying the user data of the UE 100 from the external network to the PGW 700, or an address of an apparatus that is a relay target when relaying the user data from the UE 100 to the external network.

When determining that the user data of the UE 100 is not relayed via the HA indicated by the address of the HA, the PGW 700 requests to maintain the connection of the cellular network, to the UE 100. When receiving the user data of the UE 100, the PGW 700 relays the user data by way of the maintained connection. The PGW 700 relays the user data until the reception of the user data relayed via the HA is ended.

On the other hand, when receiving the request to maintain the connection of the cellular network, for example, the UE 100 maintains the connection of the cellular network. The UE 100 receives the user data on the communication started before switching the accommodation target of the traffic, via the cellular network, from the PGW 700. When this communication is ended, the UE 100 ends the connection with the cellular network. On the other hand, the UE 100 performs connection with the wireless LAN network by switching the accommodation target of the traffic. The UE 100 receives the user data on the communication started after switching the accommodation target of the traffic, via the wireless LAN network, from the WAG 350-2.

As a result, even when the address corresponding to the AP 300-2 based on the user preference information does not match the PGW 700, it is possible to realize a seamless offload.

Furthermore, in either one of the cases, that is, when the UE 100 is not capable of acquiring the global address of the PGW 700, when the PGW 700 does not provide a resource used for relaying the user data of another network, or when the PGW 700 does not publish the global address of the PGW 700, as described above, the UE 100 receives the user data on the communication started before switching the accommodation target of the traffic, via the cellular network, from the PGW 700, whereby it is possible to realize a seamless offload.

It is noted that when it is preferable that the UE 100 restarts receiving the user data from the accommodation target without the PGW 700 relaying the user data, the PGW 700 may determine to not relay the user data. For example, when a time requiring to compete the reception of the user data when the UE 100 restarts receiving the user data from the accommodation target is shorter than a time requiring to complete the reception of the user data when the PGW 700 performs the relay, the PGW 700 may determine, on the basis of estimated throughput in the wireless LAN network, to not relay the user data.

In the above-described embodiments, the PGW 700 registers the location of the UE 100 on the basis of the request for the location registration from the UE 100; however, this is not limiting. For example, when transmitting the offload command to the UE 100, the PGW 700 may acquire, via a third party server, the location information of the UE 100 in another network (a second wireless LAN network, for example). The PGW 700 is capable of registering the location of the UE 100 in the other network, on the basis of the acquired location information of the UE 100. It is noted that the third party server is, for example, an authentication server that authenticates that the UE 100 is connected to the network, and manages the location of the UE 100 in each of a plurality of networks.

Furthermore, when receiving from the UE 100 information on the location of the UE 100 in another network (address of the UE 100 in the wireless LAN network, for example) without receiving the location registration request from the UE 100, the PGW 700 may register, on the basis of the information, the location of the UE 100 in the other network.

In the above-described embodiments, a case is described where the accommodation target of the traffic of the user data is switched from the cellular network to the wireless LAN network; however, it is possible to use a method similar to the above-described method, even in a network other than the wireless LAN network.

In the above-described embodiments, as one example of cellular communication system, the LTE system is described; however, the present disclosure is not limited to the LTE system, and the present disclosure may be applied to systems other than the LTE system. In each operation sequence described above, the operation performed by the PGW 700 may be performed by, instead of the PGW 700, another network apparatus that configures the cellular network such as the eNB 200.

It is noted that the entire content of Japanese Patent Application No. 2013-264609 (filed on Dec. 20, 2013) is incorporated in the present specification by reference.

INDUSTRIAL APPLICABILITY

Thus, a communication control method, a gateway apparatus, and a user terminal according to the present embodiment, with which it is possible to realize a seamless offload when an accommodation target of traffic of the user terminal is switched from a cellular network to another network, are useful in a mobile communication field.

The invention claimed is:

1. A communication control method, comprising the steps of:
    relaying, by a gateway apparatus in a cellular network, user data from an external network to a user terminal connected to the cellular network;
    switching an accommodation target of traffic of the user terminal from the cellular network to a Wireless Local Area Network (WLAN) network not managed by an operator managing the cellular network;
    receiving, by the user terminal, first information including identification information of a WLAN access point from a server managing ANDSF information on the WLAN network;
    determining, by the user terminal, whether or not identification information of a WLAN access point to which the user terminal connects after switching the accommodation target of traffic to the WLAN network, is included in the first information;
    requesting, by the user terminal, to the cellular network, a global address of the gateway apparatus in response to a determination that the identification information of the WLAN access point is not included in the first information;
    obtaining, by the user terminal, the global address from the cellular network;
    requesting, by the user terminal, based on the global address, that the gateway apparatus register a location of the user terminal in the WLAN network;
    registering, by the gateway apparatus, the location of the user terminal in the WLAN network, in response to the request; and
    relaying, by the gateway apparatus, on a basis of the location of the user terminal in the WLAN network, the user data to the user terminal, via the WLAN network.

2. The communication control method according to claim 1, further comprising the steps of:
    acquiring, by the user terminal, an address of a home agent managing the location of the user terminal, and transmitting the address of the home agent to the cellular network;
    determining, by the cellular network, whether or not the address of the home agent is the global address of the gateway apparatus;
    determining, by the cellular network, whether or not the user data is relayed via the home agent before the accommodation target of the traffic is switched;
    maintaining, by the user terminal, connection with the cellular network even after the switching, in response to a determination that the acquired address of the home agent is not the global address of the gateway apparatus and the user data is not relayed via the home agent;
    receiving, by the user terminal, even after the switching, via the cellular network from the gateway apparatus, user data on communication started by the user terminal before the switching; and
    receiving, by the user terminal, via the WLAN network from a network apparatus different from the gateway apparatus, user data on communication newly started by the user terminal after the switching.

3. A user terminal used in a communication system capable of switching an accommodation target of traffic of a user terminal from a cellular network to a Wireless Local Area Network (WLAN) network, comprising:
    a receiver configured to receive, while being connected to the cellular network, user data that is relayed from a gateway apparatus in the cellular network and that is from an external network; and
    a controller, wherein
    the receiver is configured to receive first information including identification information of a WLAN access point from a server managing ANDSF information on the WLAN network,
    the controller is configured to determine whether or not identification information of a WLAN access point to which the user terminal connects after switching the accommodation target of traffic to the WLAN network, is included in the first information,
    the controller is configured to request to the cellular network, a global address of the gateway apparatus in response to a determination that the identification information of the WLAN access point is not included in the first information, the controller is configured to obtain the global address from the cellular network, the controller is configured to request based on the global address, that the gateway apparatus register a location of the user terminal in the WLAN network, and the receiver is configured to receive the user data via the WLAN network from the gateway apparatus.

* * * * *